US012679762B2

(12) United States Patent　　　(10) Patent No.:　US 12,679,762 B2
Zhao et al.　　　(45) Date of Patent:　　Jul. 14, 2026

(54) LOW BIO-PERSISTENT HIGH TEMPERATURE RESISTANT INORGANIC FIBERS

(71) Applicant: UNIFRAX I LLC, Tonawanda, NY (US)

(72) Inventors: Donghui Zhao, Amherst, NY (US); Jason M. Hamilton, Lancaster, NY (US); Karen L. Hanson, Youngstown, NY (US); Mauricio Munhoz De Souza, Amherst, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 1238 days.

(21) Appl. No.: 17/619,959

(22) PCT Filed: Dec. 9, 2021

(86) PCT No.: PCT/US2021/072821

§ 371 (c)(1),
(2) Date: Dec. 16, 2021

(87) PCT Pub. No.: WO2022/126118

PCT Pub. Date: Jun. 16, 2022

(65) Prior Publication Data

US 2022/0234944 A1　　　Jul. 28, 2022

Related U.S. Application Data

(60) Provisional application No. 63/124,518, filed on Dec. 11, 2020.

(51) Int. Cl.
　　*C03C 13/00*　　　(2006.01)
　　*C03B 37/01*　　　(2006.01)
　　(Continued)

(52) U.S. Cl.
CPC .............. *C03C 13/00* (2013.01); *C03B 37/01* (2013.01); *C03C 3/087* (2013.01); *C03C 4/0014* (2013.01);
(Continued)

(58) Field of Classification Search
None
See application file for complete search history.

(56) References Cited

U.S. PATENT DOCUMENTS 6,953,757 B2　10/2005　Zoitos et al.
7,468,336 B2　12/2008　Zoitos et al.
(Continued)

FOREIGN PATENT DOCUMENTS

CN　　　109071363 A　　12/2018
CN　　　111448173 A　　7/2020
(Continued)

OTHER PUBLICATIONS

Notice of Grounds for Rejection for Korean Patent Application No. 10-2023-7022454 issued by The Korean Intellectual Property Office dated Aug. 23, 2024. (4 pgs.).
(Continued)

*Primary Examiner* — Amber R Orlando
*Assistant Examiner* — Paul Alan Forsyth
(74) *Attorney, Agent, or Firm* — Haynes and Boone, LLP

(57)　　　ABSTRACT

A high temperature resistant inorganic fiber includes 72 to 77.3 weight percent silica; 10.2 to 15 weight percent magnesia; 12.4 to 17 weight percent calcia; 0 to 1.5 weight percent alumina; and 0 to 0.6 weight percent total alkali oxides; the fiber has a use temperature of at least 1260° C.; the fiber may exhibit a shrinkage of greater than 5% after exposure to a temperature of 1400° C. for 24 hours; and the fiber may have a melt temperature of less than 1400° C.

9 Claims, 2 Drawing Sheets

(51) Int. Cl.
*C03C 3/087* (2006.01)
*C03C 4/00* (2006.01)

(52) U.S. Cl.
CPC ...... *C03C 2204/00* (2013.01); *C03C 2213/02*
(2013.01)

(56) References Cited

U.S. PATENT DOCUMENTS

| | | | |
|---|---|---|---|
| 8,303,901 | B2 | 11/2012 | Tanahashi et al. |
| 9,932,264 | B2 | 4/2018 | Iwata et al. |
| 2001/0024626 | A1 | 9/2001 | TenEyck |
| 2003/0162019 | A1* | 8/2003 | Zoitos ................. C04B 35/6224 428/364 |
| 2005/0032619 | A1 | 2/2005 | Zoitos et al. |
| 2007/0049481 | A1* | 3/2007 | Asano ................... C03B 37/055 65/456 |
| 2013/0071660 | A1* | 3/2013 | Lee ....................... C03C 13/007 428/401 |
| 2015/0175477 | A1* | 6/2015 | Zhao ........................ C03C 13/06 428/221 |
| 2017/0197872 | A1* | 7/2017 | Iwata ...................... C03C 3/087 |
| 2022/0212980 | A1* | 7/2022 | Yokota ................... C03C 13/00 |

FOREIGN PATENT DOCUMENTS

| | | | |
|---|---|---|---|
| EP | 0074655 | A1 | 3/1983 |
| EP | 1463776 | A1 | 10/2004 |
| EP | 1544177 | B1 | 1/2008 |
| EP | 1725503 | B1 | 7/2008 |
| EP | 3178795 | A1 | 6/2017 |
| EP | 2 360 131 | B1 | 5/2018 |
| JP | 2005-515307 | A | 5/2005 |
| JP | 2016-037427 | A | 3/2016 |
| KR | 10-0822243 | B1 | 4/2008 |
| WO | WO 03/060016 | A1 | 7/2003 |
| WO | WO 2017/127501 | A1 | 7/2017 |
| WO | WO 2020/230550 | A1 | 11/2020 |

OTHER PUBLICATIONS

English Translation of Notice of Grounds for Rejection for Korean Patent Application No. 10-2023-7022454 issued by The Korean Intellectual Property Office dated Aug. 23, 2024. (4 pgs.).

International Search Report and Written Opinion issued by the Korean Intellectual Property Office as International Searching Authority for International Application No. PCT/US2021/072821 dated Apr. 6, 2022. (9 pages).

Supplementary European Search Report issued in European Patent Application No. 21823464.9, dated Nov. 7, 2023, (6 pgs.).

First Office Action for Chinese Patent Application No. 202180083313.6 issued by the China National Intellectual Property Administration, dated Feb. 25, 2025. (10 pgs.).

English Translation of First Office Action for Chinese Patent Application No. 202180083313.6 issued by the China National Intellectual Property Administration, dated Feb. 25, 2025. (18 pgs.).

* cited by examiner

1

LOW BIO-PERSISTENT HIGH TEMPERATURE RESISTANT INORGANIC FIBERS

CROSS REFERENCE TO RELATED APPLICATIONS

This application is a U.S. National Stage patent application of International Patent Application No. PCT/US2021/072821 filed on Dec. 9, 2021, which claims the benefit of U.S. Provisional Patent Application No. 63/124,518 filed Dec. 11, 2020 and entitled LOW BIO-PERSISTENT HIGH TEMPERATURE RESISTANT INORGANIC FIBERS, the entirety of which is hereby incorporated by reference.

FIELD OF THE DISCLOSURE

The present disclosure relates to inorganic fibers. More particularly, the disclosure relates to low bio-persistent, high temperature resistant alkaline earth silicate (AES) fiber chemistries.

BACKGROUND

AES fibers are primarily composed of alkaline earth oxides (e.g., MgO, CaO, etc.) and silica, often combined with some small amount of alumina, alkali oxides, or other additives in order to improve fiberization performance. With careful fiber composition design, the AES fibers may offer high temperature thermal stability, which is critical for thermal insulation applications, and can be low bio-persistent, which is important for the safety and health of the manufacturers and end users of the fibers and fiber products.

In order to be fiberizable (i.e., able to be formed into fibers), AES fiber compositions typically contain silica content in the range of 60 to 85 wt %. In general, the melting temperature increases with silica content of AES fiber compositions. Therefore, AES fibers with high silica content (i.e., greater than 77 wt %) are capable of providing excellent thermal stability at the temperature of 1200° C. or above. ISOFRAX® and ISOFRAX® 1400 (available from Unifrax I LLC) predominantly comprise magnesia silicate chemistry with a silica content of greater than 77 wt % and are capable of performance at 1260° C. and above.

However, manufacturing high-silica AES fibers is challenging, due to the extremely high melting temperature and "short" viscosity curve. A "short" viscosity curve means that there is a narrow temperature window in which the viscosity is appropriate for fiberization, which poses a large challenge for manufacturing as well as fiber quality. At high silica content, the AES chemistries have high melting temperatures. For instance, the liquidus temperature for a magnesia silica chemistry with 79 wt % silica is greater than 1800° C., and the viscosity at the liquidus temperature is low, only about 50 poise. The high liquidus temperature requires high temperature for melting and fiberizing such melt. For example, the raw materials of the aforementioned magnesia silica chemistry may need to be heated to a temperature of 2100° C. in order to melt and fiberize into magnesia silica fibers. The high melting temperature poses a severe challenge to the furnacing conditions and equipment, and significantly deteriorates the lifetime of the equipment such as the furnace lining, electrodes, and fiberization devices. High-temperature insulation wools are typically produced by melting the raw materials in a submerged electrode furnace with a melt stream exiting at the bottom for fiberization. High melting or operating temperatures accelerates the corrosion of electrodes, furnace walls, and spinning wheels (in spinning fiberization processes), and thus shortens their lifetime. In addition, when melting at high temperature, a large portion of the input energy is transferred to the cooling medium surrounding the furnace, due to a large temperature gradient between the melt and cooling medium.

DETAILED DESCRIPTION

Figure 1:
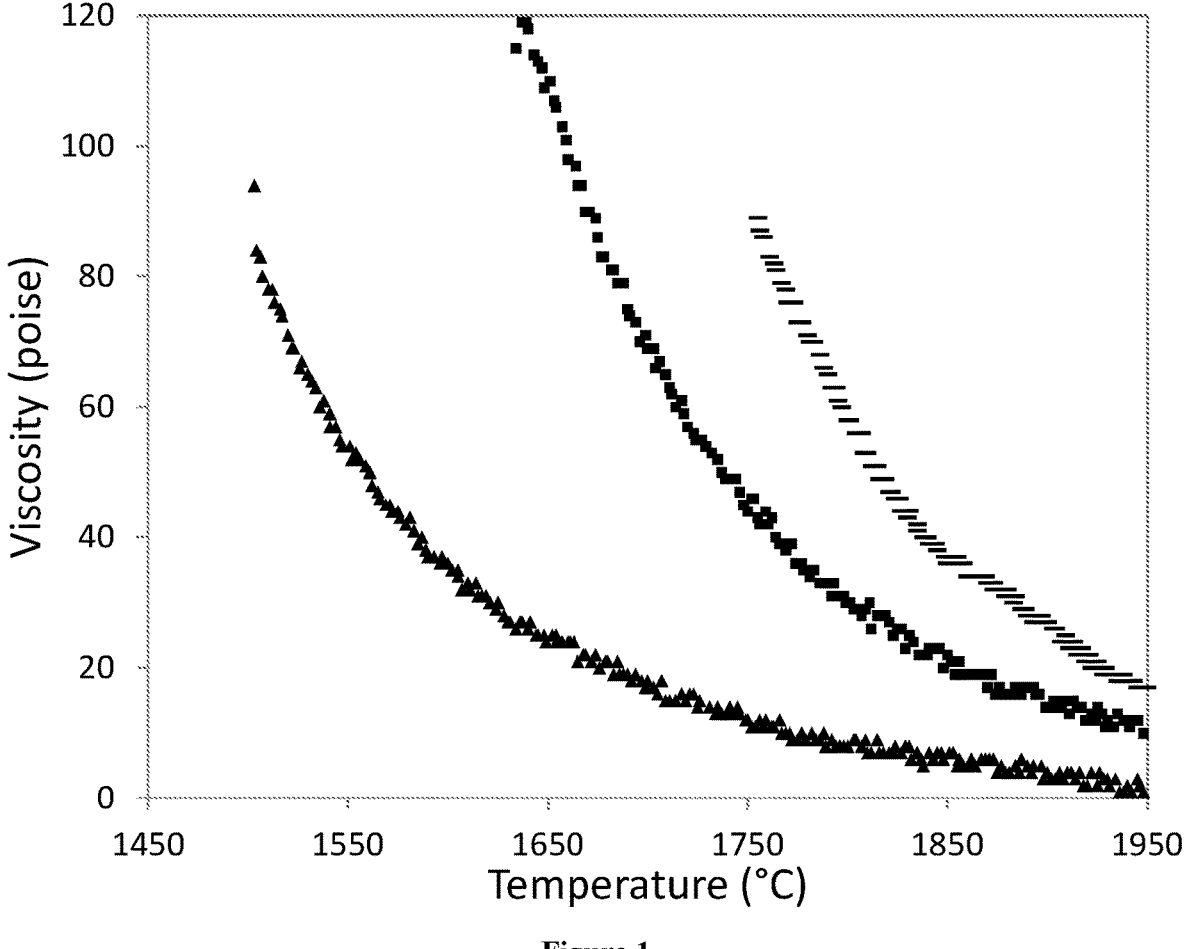
FIG. 1 is a graph of the temperature dependent viscosity curves for fibers of high-silica magnesia silica (Comparative Example C4), high-silica calcia magnesia silica (Comparative Example C6), and lower-silica calcia magnesia silica (Example 2).

The present disclosure provides improved melting and fiberization characteristics as well as product quality while improving the thermal stability of calcia magnesia silicate chemistry. According to some aspects of the present disclosure, the calcia magnesia silicate fibers are able to perform with extremely low shrinkage at temperatures of 1260° C. and above, improved blanket tensile strength and fiber index, improved melting and fiberization characteristics, and/or reduced energy consumption during manufacturing.

The inorganic fibers of the present disclosure are low bio-persistent, which means they exhibit low bio-persistence in physiological fluids, i.e., the inorganic fibers at least partially dissolve in such fluids, such as simulated lung fluid, during in vitro tests. Bio-persistence may be tested by measuring the rate at which mass is lost from the fiber ($ng/cm^2$-hr) under conditions which simulate the temperature and chemical conditions found in the human lung. This test consists of exposing approximately 0.1 g of de-shotted fiber to 50 ml of simulated lung fluid ("SLF") for 6 hours. The entire test system is maintained at 37° C., to simulate the temperature of the human body.

After the SLF has been exposed to the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study. To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute.

At the conclusion of the test, the tube is centrifuged, and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 $ng/cm^2$-hr are considered indicative of a non-biopersistent fiber. The inorganic fibers of the present disclosure may exhibit dissolution values of least 100 $ng/cm^2$-hr, at least 125 $ng/cm^2$-hr, at least 150 $ng/cm^2$-hr, at least 175 $ng/cm^2$-hr, or at least 200 $ng/cm^2$-hr in accordance with the bio-persistence test described herein (after 6 hours).

The composition for the simulated lung fluid is shown below:

| Constituent | Amount/Make-up |
|---|---|
| $NH_4Cl$ | 10.72 g/50 mL |
| NaCl | 135.6 g |
| $NaHCO_3$ | 45.36 g |
| $NaH_2PO_4 \cdot H_2O$ solution | 3.31 g/50 mL |
| $Na_3C_6H_5O_7 \cdot H_2O$ solution | 1.18 g/50 mL |
| Glycine | 9.08 g |
| $H_2SO_4$ (1N solution) | 20.0 mL |
| $CaCl_2$ (2.75 wt. % solution) | 15.8 mL |
| Formaldehyde | 20.0 mL |

The inorganic fibers of the present disclosure are high temperature resistant, which means they have a use temperature of 1260° C. or greater. The use temperature may be 1300° C. or greater. The inorganic fibers may have a melt temperature (i.e., a solidus temperature) of less than 1400° C., from 1260° C. to less than 1400° C., from 1300° C. to less than 1400° C., from 1260° C. to 1380° C., or from 1300° C. to 1380° C.

The inorganic fibers may exhibit a linear shrinkage of greater than 5%, greater than 5.5%, or greater than 6% when exposed to a temperature of 1400° C. or greater for 24 hours. The inorganic fibers may exhibit a linear shrinkage of less than 4%, less than 3.5%, or less than 3% when exposed to a temperature of 1260° C. or greater for 24 hours. The inorganic fibers may exhibit a linear shrinkage of less than 10% when exposed to a temperature of 1300° C. or greater for 24 hours.

Fibers are tested for linear shrinkage by forming them into a mat and needle punching the mat together into a pad of approximately 4-10 pounds per cubic foot density and a thickness of about 1 inch. Such pads are cut into 3 inch by 5 inch pieces and platinum pins are inserted into the face of the material. The separation distance of these pins is then carefully measured and recorded.

The pad is then placed into a furnace, ramped to temperature and held at the temperature for a fixed period of time. After heating, the pin separation is again measured to determine the linear shrinkage that pad has experienced. If the fiber is available in blanket form, measurements may be made directly on the blanket without the need to form a pad.

The inorganic fibers of the present disclosure comprise silica, magnesia, and calcia, and optionally comprise alumina, alkali oxides, or other additives. The inorganic fiber composition may be tailored to achieve a balance between thermal performance, bio-persistence, melting, and fiberization energy efficiency and product quality. The content of each component of the inorganic fibers is discussed in detail below. The inorganic fibers may comprise any logical combination of the content ranges disclosed herein (i.e., any combination that would not exceed 100 weight percent). Due to the optional inclusion of additives, the sum of the above components may be less than 100 weight percent.

The inorganic fibers may comprise silica in an amount of 72 to 77.3 weight percent, 72 to 76 weight percent, 72 to 75.5 weight percent, 72 to 75.7 weight percent, 72 to 76.7 weight percent, 72 to 76.8 weight percent, 72 to 77.3 weight percent, 73 to 77.3 weight percent, 72 to 75.8 weight percent, 73 to 75.8 weight percent, 73 to 75.5 weight percent, 73.5 to 76 weight percent, 74 to 76 weight percent, 73.5 to 75.3 weight percent, 74 to 74.8 weight percent, 74.3 to 74.5 weight percent, 74.4 weight percent, or any logical combination of the foregoing upper and lower bounds.

The inorganic fibers may comprise magnesia in an amount of greater than 10 to 15 weight percent, greater than 10 to 14 weight percent, greater than 10 to 13 weight percent, greater than 10 to 12 weight percent, 10.2 to 15 weight percent, 10.5 to 15 weight percent, 11 to 15 weight percent, 10.2 to 14 weight percent, 10.5 to 14 weight percent, 11 to 14 weight percent, 10.6 to 11.4 weight percent, 10.8 to 11.3 weight percent, 10.9 to 11.1 weight percent, 11 weight percent, or any logical combination of the foregoing upper and lower bounds.

The inorganic fibers may comprise calcia in an amount of 12.5 to 17 weight percent, 12.5 to 16 weight percent, 12.8 to 17 weight percent, 12.9 to 17 weight percent, 13 to 17 weight percent, 13 to 16 weight percent, 13 to 15 weight percent, 13 to 14 weight percent, 13.2 to 13.8 weight percent, 13.3 to 13.5 weight percent, 13.4 weight percent, or any logical combination of the foregoing upper and lower bounds.

The inorganic fibers may comprise alumina in an amount of 0 to 1.5 weight percent, 0.1 to 1.3 weight percent, 0.1 to 1.0 weight percent, 0.3 to 1.3 weight percent, 0.4 to 1.2 weight percent, 0.5 to 1.1 weight percent, 0.7 to 0.9 weight percent, 0.8 weight percent, or any logical combination of the foregoing upper and lower bounds.

The inorganic fibers may comprise alkali oxides in a total amount of 0 to 0.6 weight percent, 0 to 0.5 weight percent, 0 to 0.4 weight percent, 0 to 0.3 weight percent, 0.1 to 0.6 weight percent, 0.2 to 0.6 weight percent, 0.3 to 0.5 weight percent, 0.4 weight percent, or any logical combination of the foregoing upper and lower bounds.

The inorganic fibers may comprise lithium oxide in an amount of 0 to 0.6 weight percent, 0 to 0.5 weight percent, 0 to 0.4 weight percent, 0 to 0.3 weight percent, 0.1 to 0.6 weight percent, 0.2 to 0.6 weight percent, 0 to 0.2 weight percent, 0.1 weight percent, or any logical combination of the foregoing upper and lower bounds.

The inorganic fibers may comprise potassium oxide in an amount of 0 to 0.6 weight percent, 0 to 0.5 weight percent, 0 to 0.4 weight percent, 0 to 0.3 weight percent, 0.1 to 0.6 weight percent, 0.2 to 0.6 weight percent, 0.2 to 0.4 weight percent, 0.3 weight percent, or any logical combination of the foregoing upper and lower bounds.

The inorganic fibers may comprise potassium oxide in an amount of 70 mol % or less, based on a total content of alkali metal oxides in the inorganic fibers.

The inorganic fibers may comprise an additive such as zirconia, boron trioxide, phosphorus pentoxide, ferric oxide, strontia, or combinations thereof. The inorganic fibers may exclude one or more of zirconia, boron trioxide, phosphorus pentoxide, ferric oxide, and/or strontia. Any one additive may be present in an amount of less than 0.1 weight percent or less than 0.05 weight percent.

The inorganic fibers may comprise iron oxide in an amount of less than 0.15 weight percent, 0.10 weight percent or less, less than 0.10 weight percent, or 0.07 weight percent or less. The inorganic fibers may comprise sodia in an amount of less than 0.10 weight percent, less than 0.08 weight percent, less than 0.06 weight percent, or 0.05 weight percent or less. The inorganic fibers may include other impurities. The impurities may each be present in an amount of less than 0.3 weight percent, less than 0.20 weight percent, less than 0.15 weight percent, less than 0.10 weight percent, less than 0.05 weight percent, or less than 0.01 weight percent. The fiber may include a total amount of impurities of less than 1.0 weight percent, less than 0.75 weight percent, less than 0.50 weight percent, less than 0.30 weight percent, or less than 0.10 weight percent.

As discussed above, the inorganic fibers of the present disclosure may comprise silica, magnesia, calcia, alumina, alkali oxides, and additives in any combination of the foregoing content ranges. The following specific combinations are only for illustrative purposes and are not meant to be limiting. The inorganic fibers may comprise:

72 to 77.3 weight percent silica, 10.2 to 15 weight percent magnesia, 12.5 to 17 weight percent calcia, 0 to 1.5 weight percent alumina, and 0 to 0.6 weight percent total alkali oxides;

72 to 76.5 weight percent silica, 11 to 15 weight percent magnesia, 12.5 to 17 weight percent calcia, 0 to 1.5 weight percent alumina, and 0 to 0.6 weight percent total alkali oxides;

72 to 76 weight percent silica, 11 to 15 weight percent magnesia, 13 to 17 weight percent calcia, 0 to 1.5 weight percent alumina, and 0 to 0.6 weight percent total alkali oxides;

72 to 76.8 weight percent silica, 10.2 to 15 weight percent magnesia, 13 to 17 weight percent calcia, 0 to 1.5 weight percent alumina, and 0 to 0.6 weight percent total alkali oxides;

72 to 75.8 weight percent silica, 11 to 15 weight percent magnesia, 13 to 17 weight percent calcia, 0.2 to 1.5 weight percent alumina, and 0 to 0.6 weight percent total alkali oxides;

72 to 77.1 weight percent silica, 10.2 to 15 weight percent magnesia, 12.5 to 17 weight percent calcia, 0.2 to 1.5 weight percent alumina, and 0 to 0.6 weight percent total alkali oxides;

72 to 77.1 weight percent silica, 10.2 to 15 weight percent magnesia, 12.5 to 17 weight percent calcia, 0 to 1.5 weight percent alumina, and 0.2 to 0.6 weight percent total alkali oxides;

72 to 75.7 weight percent silica, 11 to 15 weight percent magnesia, 13 to 17 weight percent calcia, 0.2 to 1.5 weight percent alumina, and 0.1 to 0.6 weight percent total alkali oxides;

72 to 76.7 weight percent silica, 10.5 to 15 weight percent magnesia, 12.8 to 17 weight percent calcia, 0 to 1.5 weight percent alumina, and 0 to 0.6 weight percent total alkali oxides;

72 to 76 weight percent silica, 11 to 15 weight percent magnesia, 12.5 to 17 weight percent calcia, 0 to 1.5 weight percent alumina, and 0 to 0.6 weight percent total alkali oxides;

72 to 76 weight percent silica, 10.2 to 15 weight percent magnesia, 13 to 17 weight percent calcia, 0 to 1.5 weight percent alumina, and 0 to 0.6 weight percent total alkali oxides;

73 to 75.5 weight percent silica, 10.5 to 11.5 weight percent magnesia, 13 to 14 weight percent calcia, 0.3 to 1 weight percent alumina, and 0.2 to 0.6 weight percent total alkali oxides;

73.3 to 75.2 weight percent silica, 10.5 to 11.5 weight percent magnesia, 12.9 to 13.9 weight percent calcia, 0.8 weight percent alumina, 0.1 weight percent lithium oxide, and 0.3 weight percent potassium oxide;

73 to 74.8 weight percent silica, 11.1 to 12.1 weight percent magnesia, 12.7 to 13.7 weight percent calcia, 0.8 weight percent alumina, 0.1 weight percent lithium oxide, and 0.3 weight percent potassium oxide;

73 to 74.8 weight percent silica, 11.5 to 12.5 weight percent magnesia, 12.3 to 13.3 weight percent calcia, 0.8 weight percent alumina, 0.1 weight percent lithium oxide, and 0.3 weight percent potassium oxide;

6

73 to 74.8 weight percent silica, 12 to 13 weight percent magnesia, 11.8 to 12.8 weight percent calcia, 0.8 weight percent alumina, 0.1 weight percent lithium oxide, and 0.3 weight percent potassium oxide 74.4 weight percent silica, 11 weight percent magnesia, 13.4 weight percent calcia, 0.8 weight percent alumina, 0.1 weight percent lithium oxide, and 0.3 weight percent potassium oxide;

74.2 weight percent silica, 11.6 weight percent magnesia, 13.0 weight percent calcia, 0.8 weight percent alumina, 0.1 weight percent lithium oxide, and 0.3 weight percent potassium oxide;

74 weight percent silica, 11.6 weight percent magnesia, 13.2 weight percent calcia, 0.8 weight percent alumina, 0.1 weight percent lithium oxide, and 0.3 weight percent potassium oxide;

74 weight percent silica, 12 weight percent magnesia, 12.8 weight percent calcia, 0.8 weight percent alumina, 0.1 weight percent lithium oxide, and 0.3 weight percent potassium oxide or 74 weight percent silica, 12.5 weight percent magnesia, 12.3 weight percent calcia, 0.8 weight percent alumina, 0.1 weight percent lithium oxide, and 0.3 weight percent potassium oxide.

EXAMPLES

Fibers of various compositions were prepared and tested for thermal performance, as described in detail below. The compositions of Comparative Examples C2-C9 and Examples 1-18c are summarized in Table 1 below. Comparative Example C1 comprised alumina silicate fibers.

TABLE 1

| Chemical compositions of fibers (wt %) | | | | | |
|---|---|---|---|---|---|
| Examples | SiO$_2$ | MgO | CaO | Al$_2$O$_3$ | Li$_2$O | K$_2$O |
| C2 | 63.6 | 5.2 | 30.7 | 0.29 | 0 | 0.03 |
| C3 | 78.6 | 18.8 | 0.4 | 1.84 | 0 | 0.07 |
| C4 | 79.2 | 18.5 | 0.3 | 1.49 | 0.30 | 0.02 |
| C5 | 72.5 | 1.0 | 24.3 | 1.30 | 0 | 0.83 |
| C6 | 78.9 | 13.2 | 5.7 | 1.45 | 0.30 | 0.26 |
| C7 | 71.0 | 21.3 | 5.9 | 1.16 | 0.30 | 0.21 |
| C8 | 70.6 | 17.1 | 10.4 | 1.25 | 0.31 | 0.24 |
| C9 | 72.6 | 11.9 | 14.0 | 0.51 | 0.46 | 0.24 |
| 1 | 74.4 | 10.2 | 13.2 | 1.41 | 0.34 | 0.25 |
| 2 | 74.0 | 11.2 | 12.8 | 1.36 | 0.34 | 0.23 |
| 3 | 72.3 | 11.6 | 14.1 | 1.26 | 0.34 | 0.22 |
| 4 | 74.0 | 10.9 | 13.2 | 1.48 | 0.30 | 0.03 |
| 5 | 75.8 | 10.5 | 12.5 | 0.77 | 0 | 0.26 |
| 6 | 74.6 | 10.7 | 13.0 | 1.31 | 0.28 | 0.02 |
| 7 | 74.7 | 10.2 | 13.3 | 1.28 | 0.30 | 0.03 |
| 8 | 74.5 | 10.3 | 13.4 | 1.29 | 0.30 | 0.01 |
| 9 | 74.4 | 10.3 | 13.5 | 1.31 | 0.29 | 0.02 |
| 10 | 75.2 | 11.2 | 13.1 | 0.27 | 0 | 0.02 |
| 11 | 74.7 | 10.6 | 13.1 | 1.18 | 0.30 | 0.02 |
| 12a | 75.2 | 10.3 | 12.6 | 0.37 | 0.086 | 0.24-0.28 |
| 12b | 75.2 | 10.3 | 12.6 | 0.37 | 0.086 | 0.24-0.28 |
| 12c | 75.2 | 10.3 | 12.6 | 0.37 | 0.086 | 0.24-0.28 |
| 13a | 74.7 | 10.9 | 13.5 | 0.73 | 0 | 0.04 |
| 13b | 74.7 | 10.9 | 13.5 | 0.73 | 0 | 0.04 |
| 14a | 74.0 | 11.0 | 13.7 | 0.79 | 0.090 | 0.31-0.37 |
| 14b | 74.0 | 11.0 | 13.7 | 0.79 | 0.090 | 0.31-0.37 |
| 14c | 74.0 | 11.0 | 13.7 | 0.79 | 0.090 | 0.31-0.37 |
| 15a | 74.8 | 10.7 | 13.1 | 0.79 | 0.088 | 0.42-0.49 |
| 15b | 74.8 | 10.7 | 13.1 | 0.79 | 0.088 | 0.42-0.49 |
| 15c | 74.8 | 10.7 | 13.1 | 0.79 | 0.088 | 0.42-0.49 |
| 15d | 74.8 | 10.7 | 13.1 | 0.79 | 0.088 | 0.42-0.49 |
| 15e | 74.8 | 10.7 | 13.1 | 0.79 | 0.088 | 0.42-0.49 |
| 16a | 73.6 | 12.1 | 13.2 | 0.61 | 0 | 0.31 |
| 16b | 73.6 | 12.1 | 13.2 | 0.61 | 0 | 0.31 |
| 16c | 73.6 | 12.1 | 13.2 | 0.61 | 0 | 0.31 |

TABLE 1-continued

| | | Chemical compositions of fibers (wt %) | | | |
|---|---|---|---|---|---|
| Examples | SiO$_2$ | MgO | CaO | Al$_2$O$_3$ | Li$_2$O | K$_2$O |
| 17a | 74.9 | 10.5 | 13.0 | 1.28 | 0.041 | 0.12-0.15 |
| 17b | 74.9 | 10.5 | 13.0 | 1.28 | 0.041 | 0.12-0.15 |
| 17c | 74.9 | 10.5 | 13.0 | 1.28 | 0.041 | 0.12-0.15 |
| 17d | 74.9 | 10.5 | 13.0 | 1.28 | 0.041 | 0.12-0.15 |
| 18a | 74.0 | 11.0 | 13.5 | 1.32 | 0.085 | 0.039-0.04 |
| 18b | 74.0 | 11.0 | 13.5 | 1.32 | 0.085 | 0.039-0.04 |
| 18c | 74.0 | 11.0 | 13.5 | 1.32 | 0.085 | 0.039-0.04 |

FIG. 1 compares the temperature dependent viscosity curves for a magnesia silica melt (Comparative Example C4, marked as dashed lines on the right side of the graph) with an excessively high silica content of 79.2 weight percent, a calcia magnesia silica melt (Comparative Example C6, marked as squares in the middle of the graph) with an excessively high silica content of 78.9 weight percent, and a calcia magnesia silica melt (Example 2, marked by triangles on the left side of the graph) with a lower silica content of 74 weight percent. As shown in FIG. 1, the viscosity curve shifts to lower temperature as the silica content decreases and as the calcia replaces magnesia. The temperatures at the viscosity point of 50 poise are 1561° C., 1737° C., and 1815° C. for Example 2, Comparative Example C6, and Comparative Example C4, respectively. With the temperature-viscosity curve shifting about 250° C. lower, the melting and fiberization process can be expected to occur at much lower temperature, thus reducing energy consumption, increasing melting rate and production rate, and extending the lifetime of the furnace, electrodes, and fiberization devices. Furthermore, as the viscosity curve shifts to lower temperature and the slope of the curves flattens, the melt gains a wider temperature window for fiberization, which means improvement of fiber product quality such as fiber index and blanket tensile strength.

Accordingly, it is important to set the silica content of the inorganic fibers to 77.3 weight percent or less.

Additionally, to achieve desired thermal performance, the silica content should stay at or above 72 weight percent or at or about 73 weight percent. Thermal performance refers to linear shrinkage and compression recovery of fiber products after being exposed to application temperature. At low silica (e.g., less than 73 or 71.5 weight percent), as seen in Comparative Examples C7 and C8, the linear shrinkage exceeded 10% after firing at 1260° C. for 24 hours, as shown in Table 2. On the other hand, the materials with silica contents within the ranges disclosed herein (e.g., 72 weight percent or greater) exhibited much improved thermal stability, e.g., linear shrinkage of less than 4% after firing at 1260° C. for 24 hours. Further results on thermal performance, namely linear shrinkage, compression recovery, and compression strength, are shown in Tables 2-4, respectively.

The test procedures for linear shrinkage are discussed in detail above.

Compression recovery is a measure of the mechanical performance of an inorganic fiber in response to the exposure of the fiber to a desired use temperature for a given period of time. Compression recovery was measured by firing test pads manufactured from the inorganic fiber material to the test temperature for the selected period of time. The fired test pads were thereafter compressed to half of their original thickness and allowed to rebound for 24 hours. The amount of rebound was measured as percent recovery of the compressed thickness of the pad.

Compression strength was measured by firing test pads manufactured from the inorganic fiber material to the test temperature for the selected period of time and then applying a compressive force until the fired test pads compress to 50% of their original thickness at a rate of 1 inch per minute.

In Tables 2-6 below, dashes indicate that the measurement was either not taken or the property was unmeasurable.

TABLE 2

| | | Linear shrinkage of fiber blankets at firing temperatures | | | | |
|---|---|---|---|---|---|---|
| | | | | Linear shrinkage % | | |
| Example | Fiber diameter (um) | 1150° C. 168 hours | 1200° C. 168 hours | 1260° C. 24 hours | 1260° C. 168 hours | 1300° C. 24 hours |
| C1 | — | — | — | — | — | 7.8 |
| C2 | 3.9 | 1.1 | — | 4.8 | — | — |
| C3 | — | — | — | — | 6.7 | — |
| C4 | 4.1 | 2.4 | 2.4 | 2.5 | 2.7 | 2.4 |
| C5 | 4.4 | 1.3 | 1.3 | 1.2 | 1.7 | 3.6 |
| C6 | 3.2 | — | — | 2.1 | 3.1 | 3.2 |
| C7 | 2.3 | — | — | 16.6 | — | — |
| C8 | 2.3 | — | — | 11.7 | — | — |
| C9 | 3.3 | — | — | 2.8 | — | 7.9 |
| 1 | 3.4 | — | — | 1.6 | — | 3.7 |
| 2 | 3.2 | — | — | 1.9 | 3.3 | 5.0 |
| 3 | 3.4 | — | — | 2.0 | 3.6 | 5.5 |
| 4 | — | — | — | 1.8 | — | 3.8 |
| 5 | — | — | — | 2.7 | — | 2.8 |
| 6 | 3.4 | 1.8 | — | — | 3.0 | 8.5 |
| 7 | 3.8 | 1.8 | — | — | 3.3 | 7.8 |
| 8 | 3.5 | 1.7 | — | — | 4.4 | 9.0 |
| 9 | 3.6 | 2.0 | — | — | 4.8 | 9.5 |
| 11 | 3.8 | — | 2.1 | 2.0 | — | 8.1 |
| 12a | 4.6 | — | 1.9 | — | — | 2.1 |
| 12b | 3.3 | — | 1.8 | — | — | 1.9 |
| 12c | 2.6 | — | 2.0 | — | — | 2.2 |
| 13a | 3.8 | — | 2.3 | — | — | 2.4 |
| 13b | 3.4 | — | 2.1 | — | — | 2.3 |
| 14a | 4.0 | — | 2.1 | — | — | 2.1 |

TABLE 2-continued

Linear shrinkage of fiber blankets at firing temperatures

| Example | Fiber diameter (um) | Linear shrinkage % 1150° C. 168 hours | Linear shrinkage % 1200° C. 168 hours | Linear shrinkage % 1260° C. 24 hours | Linear shrinkage % 1260° C. 168 hours | Linear shrinkage % 1300° C. 24 hours |
|---|---|---|---|---|---|---|
| 14b | 3.1 | — | 1.9 | — | — | 2.0 |
| 14c | 2.8 | — | 1.8 | — | — | 1.9 |
| 15a | 4.3 | — | 3.1 | — | — | 2.9 |
| 15b | 3.9 | — | 2.9 | — | — | 2.8 |
| 15c | 3.4 | — | 4.1 | — | — | 4.6 |
| 15d | 2.9 | — | 4.1 | — | — | 4.0 |
| 15e | 2.7 | — | 4.1 | — | — | 4.0 |
| 16a | 4.4 | — | 3.0 | — | — | 2.9 |
| 16b | 3.6 | — | 2.6 | — | — | 2.6 |
| 16c | 2.8 | — | 2.6 | — | — | 2.5 |
| 17a | 4.6 | — | 2.5 | — | — | 2.4 |
| 17b | 4.0 | — | 2.3 | — | — | 2.2 |
| 17c | 3.3 | — | 1.9 | — | — | 2.1 |
| 17d | 2.6 | — | 2.1 | — | — | 2.5 |
| 18a | 3.8 | — | 1.7 | — | — | 2.0 |
| 18b | 3.3 | — | 1.8 | — | — | 2.4 |
| 18c | 2.6 | — | 1.5 | — | — | 2.1 |

TABLE 3

Compression recovery of fiber blankets after firing

| Example | Compression Recovery % 1150° C. - 1-week | Compression Recovery % 1200° C. - 1-week | Compression Recovery % 1260° C. - 24 hrs | Compression Recovery % 1260° C. - 1-week | Compression Recovery % 1300° C. - 24 hrs |
|---|---|---|---|---|---|
| C1 | — | — | — | — | — |
| C2 | 27 | — | 3 | — | — |
| C3 | — | — | — | 44 | — |
| C4 | 55 | 55 | 53 | 54 | 43 |
| C5 | 64 | 64 | 46 | 50 | 33 |
| C6 | — | — | 49 | 43 | 33 |
| C7 | — | — | 26 | — | — |
| C8 | — | — | 28 | — | — |
| C9 | — | — | 8 | — | 11 |
| 1 | — | — | 45 | — | 43 |
| 2 | — | — | 53 | 51 | — |
| 3 | — | — | 39 | 44 | — |
| 4 | — | — | 37 | — | 25 |
| 5 | — | — | 79 | — | 59 |
| 6 | 51 | — | — | 22 | 10 |
| 7 | 49 | — | — | 20 | 7 |
| 8 | 47 | — | — | 18 | 8 |
| 9 | 48 | — | — | 18 | 8 |
| 11 | — | 45 | 33 | — | — |
| 12a | — | — | — | 61 | 53 |
| 12b | — | — | — | 73 | 60 |
| 12c | — | — | — | 75 | 71 |
| 13a | — | — | — | 54 | 47 |
| 13b | — | — | — | 62 | 54 |
| 14a | — | — | — | 75 | 64 |
| 14b | — | — | — | 80 | 65 |
| 14c | — | — | — | 80 | 67 |
| 15a | — | — | — | 67 | 63 |
| 15b | — | — | — | 68 | 62 |
| 15c | — | — | — | 65 | 58 |
| 15d | — | — | — | 61 | 55 |
| 15e | — | — | — | 65 | 53 |
| 16a | — | — | — | 63 | 65 |
| 16b | — | — | — | 62 | 65 |
| 16c | — | — | — | 63 | 56 |
| 17a | — | — | — | 48 | 45 |
| 17b | — | — | — | 61 | 59 |
| 17c | — | — | — | 55 | 58 |
| 17d | — | — | — | 60 | 63 |
| 18a | — | — | — | 42 | 42 |
| 18b | — | — | — | 53 | 38 |
| 18c | — | — | — | 43 | 40 |

TABLE 4

Compression strength of fiber blankets after firing

| Example | Compression Strength (psi) 1150° C. - 1-week | Compression Strength (psi) 1200° C. - 1-week | Compression Strength (psi) 1260° C. - 24 hrs | Compression Strength (psi) 1260° C. - 1-week | Compression Strength (psi) 1300° C. - 24 hrs |
|---|---|---|---|---|---|
| C2 | 3 | — | 3 | — | — |
| C3 | — | — | — | 13 | — |
| C4 | 5 | 5 | 5 | 7 | 5 |
| C5 | 12 | 12 | 9 | 8 | 8 |
| C6 | — | — | 5 | 4 | 4 |
| C7 | — | — | 22 | — | — |
| C8 | — | — | 18 | — | — |
| C9 | — | — | 1 | — | 9 |
| 1 | — | — | 6 | — | 9 |
| 2 | — | — | 5 | 9 | — |
| 3 | — | — | 5 | 10 | — |
| 4 | — | — | 3 | — | 4 |
| 5 | — | — | 9 | — | 7 |
| 6 | 5 | — | — | 2 | 2 |
| 7 | 5 | — | — | 2 | 2 |
| 8 | 5 | — | — | 2 | 2 |
| 9 | 5 | — | — | 2 | 2 |
| 11 | — | 5 | 3 | — | — |
| 12a | — | — | — | 3.3 | 2.7 |
| 12b | — | — | — | 5.7 | 4.1 |
| 12c | — | — | — | 8.9 | 8.2 |
| 13a | — | — | — | 3.8 | 3.4 |
| 13b | — | — | — | 6.2 | 4.5 |
| 14a | — | — | — | 5.5 | 4.5 |
| 14b | — | — | — | 11.3 | 7.4 |
| 14c | — | — | — | 12.0 | 8.6 |
| 15a | — | — | — | 10.3 | 11.6 |
| 15b | — | — | — | 12.9 | 10.1 |
| 15c | — | — | — | 12.2 | 10.6 |
| 15d | — | — | — | 12.2 | 14.1 |
| 15e | — | — | — | 10.3 | 10.9 |
| 16a | — | — | — | 4.0 | 5.8 |
| 16b | — | — | — | 6.6 | 8.7 |
| 16c | — | — | — | 6.5 | 5.4 |
| 17a | — | — | — | 4.1 | 3.9 |
| 17b | — | — | — | 3.6 | 3.5 |
| 17c | — | — | — | 6.0 | 6.4 |
| 17d | — | — | — | 6.3 | 6.2 |
| 18a | — | — | — | 2.3 | 3.8 |
| 18b | — | — | — | 3.8 | 3.3 |
| 18c | — | — | — | 4.5 | 4.5 |

Figure 2:
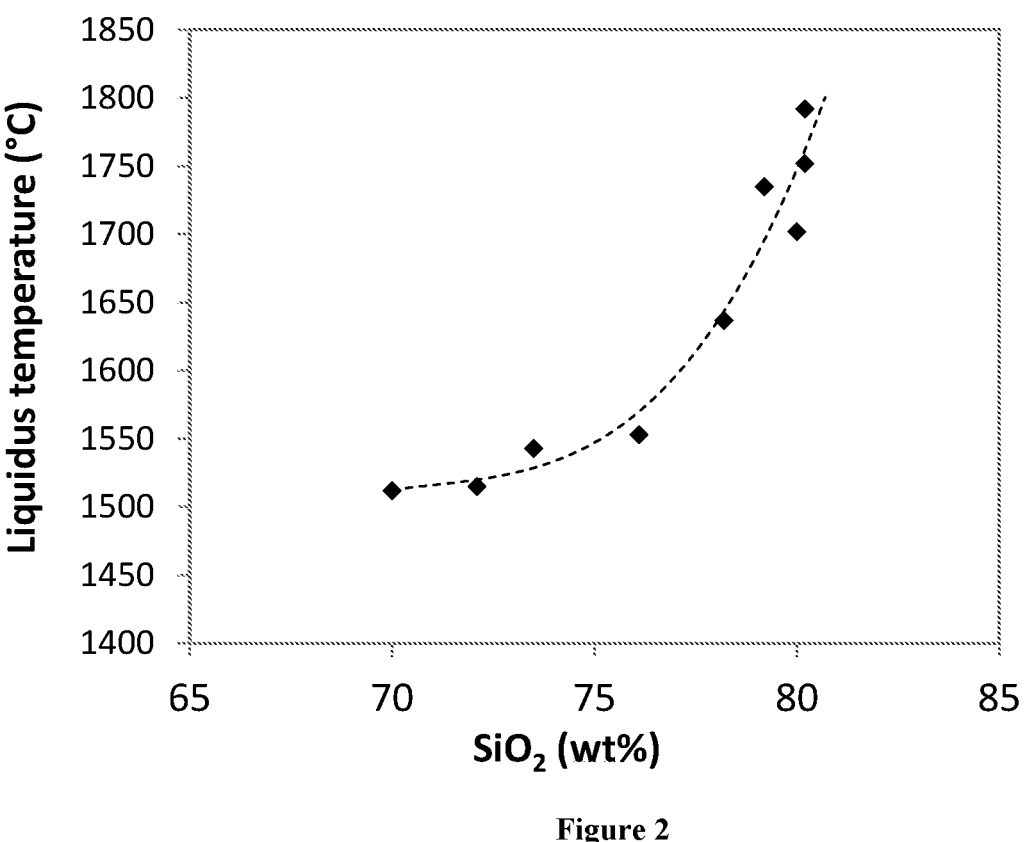
FIG. 2 is a graph of the liquidus temperature of calcia magnesia silica fibers as a function of silica content in the fiber.

The fibers with excessively high silica content (e.g., greater than 75.8 or 77.5 weight percent), for example Comparative Example C6, had excellent thermal performance (low linear shrinkage) even at temperatures as high as 1300° C. However, the melting temperature as well as the liquidus temperature of these high silica fibers increased significantly. FIG. 2 shows the dependence of liquidus temperature on silica content in the fiber. The liquidus temperature increased from 1500° C. to 1800° C. as silica content in the fiber increased. Table 5 below lists the liquidus temperature and liquidus viscosity for the Comparative Examples and Examples.

TABLE 5

| Liquidus temperature and liquidus viscosity of fiber chemistries | | |
| --- | --- | --- |
| Example | Liquidus temperature (° C.) | Liquidus viscosity (poise) |
| C1 | 1688 | 47 |
| C2 | 1347 | 76 |
| C3 | 1843 | 52 |
| C4 | 1752 | 89 |
| C5 | 1515 | 91 |
| C6 | 1639 | 119 |
| C7 | 1509 | 44 |
| C9 | 1502 | 56 |
| 1 | 1536 | 77 |
| 2 | 1506 | 83 |
| 3 | 1476 | 72 |
| 6 | 1441 | 77 |

As described above, the inorganic fibers of the present disclosure are low bio-persistent fibers. This is confirmed in Table 6 below, which shows the dissolution rate tested in static condition and flow-through condition for various time periods. The flow-through test measures the rate at which mass is lost from the fiber (ng/cm$^2$·hr) under conditions which simulate the temperature and chemical conditions found in the human lung. As discussed above, this test consists of exposing approximately 0.1 g of de-shotted fiber to a 0.3 mL/min flow of simulated lung fluid (SLF). The entire test system is maintained at 37° C., to simulate the temperature of the human body. Tests preferably last up to about four weeks. After the SLF has flowed through the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study. As noted above, fibers with dissolution values in excess of 100 ng/cm$^2$-hr are considered indicative of a non-biopersistent fiber.

TABLE 6

| Dissolution rate of fibers | | | | | |
| --- | --- | --- | --- | --- | --- |
| | | Dissolution rate (ng/cm$^2$-hr) | | | |
| | Static condition | Flow through | | | |
| Example | 6-hr static | 7 days | 14 days | 21 days | 28 days |
| C2 | — | 223.5 | 216.5 | 200.9 | 192.9 |
| C3 | — | 319.3 | 225.3 | 175.2 | 159.2 |
| C4 | — | 204.2 | 171.6 | 143.7 | 133.3 |
| C5 | — | 73.4 | 72.1 | 65.7 | 62.8 |
| C6 | 262 | — | — | — | — |
| C7 | 589 | — | — | — | — |
| C8 | 344 | — | — | — | — |
| C9 | 944 | 439.7 | 391.3 | 327.4 | 314 |
| 1 | 286 | — | — | — | — |
| 2 | 444 | 169.5 | 159.2 | 139.2 | 134.5 |

TABLE 6-continued

| Dissolution rate of fibers | | | | | |
| --- | --- | --- | --- | --- | --- |
| | | Dissolution rate (ng/cm$^2$-hr) | | | |
| | Static condition | Flow through | | | |
| Example | 6-hr static | 7 days | 14 days | 21 days | 28 days |
| 6 | — | — | 106.2 | — | 100.9 |
| 7 | — | 112.2 | 99.3 | 88.3 | 85.7 |
| 10 | — | 239.1 | 200.1 | 192.0 | 197.5 |

The following statements may be used to support the present disclosure:

1. A high temperature resistant inorganic fiber comprising a lower limit of silica of 72 weight percent and an upper limit of silica of 74 weight percent, or 74.4 weight percent, or 75 weight percent, or 75.5 weight percent, or 75.7 weight percent, or 75.8 weight percent, or 76 weight percent, or 76.3 weight percent, or 76.7 weight percent, or 76.8 weight percent, or 77 weight percent, or 77.3 weight percent; or comprising a lower limit of silica of 73 weight percent and an upper limit of silica of 74 weight percent, or 74.4 weight percent, or 75 weight percent, or 75.5 weight percent, or 75.7 weight percent, or 75.8 weight percent, or 76 weight percent, or 76.3 weight percent, or 76.7 weight percent, or 76.8 weight percent, or 77 weight percent, or 77.3 weight percent; or comprising a lower limit of silica in an amount of 73.3 weight percent and an upper limit of silica of 74 weight percent, or 74.4 weight percent, or 75 weight percent, or 75.5 weight percent, or 75.7 weight percent, or 75.8 weight percent, or 76 weight percent, or 76.3 weight percent, or 76.7 weight percent, or 76.8 weight percent, or 77 weight percent, or 77.3 weight percent; or comprising a lower limit of silica in an amount of 73.7 weight percent and an upper limit of silica of 74 weight percent, or 74.4 weight percent, or 75 weight percent, or 75.5 weight percent, or 75.7 weight percent, or 75.8 weight percent, or 76 weight percent, or 76.3 weight percent, or 76.7 weight percent, or 76.8 weight percent, or 77 weight percent, or 77.3 weight percent; or comprising a lower limit of silica in an amount of 74 weight percent and an upper limit of silica of 74.4 weight percent, or 75 weight percent, or 75.5 weight percent, or 75.7 weight percent, or 75.8 weight percent, or 76 weight percent, or 76.3 weight percent, or 76.7 weight percent, or 76.8 weight percent, or 77 weight percent, or 77.3 weight percent; or comprising a lower limit of silica in an amount of 74.4 weight percent and an upper limit of silica 75 weight percent, or 75.5 weight percent, or 75.7 weight percent, or 75.8 weight percent, or 76 weight percent, or 76.3 weight percent, or 76.7 weight percent, or 76.8 weight percent, or 77 weight percent, or 77.3 weight percent;

wherein the inorganic fiber comprises 10 to 15 weight percent magnesia, 12.5 to 17 weight percent calcia, 0 to 1.5 weight percent alumina, and 0 to 0.6 weight percent total alkali oxides;

wherein the inorganic fiber has a use temperature of at least 1260° C.; and wherein the inorganic fiber exhibits a shrinkage of greater than 5% after exposure to a temperature of 1400° C. for 24 hours.

2. An inorganic fiber according to statement 1 comprising a lower limit of magnesia of 10 and an upper limit of magnesia of 11 weight percent, or 11.1 weight percent, or 11.2 weight percent, or 11.3 weight percent, or 11.4 weight percent, or 11.7 weight percent, or 12 weight percent, or 12.3 weight percent, or 12.7 weight percent, or 13 weight percent, or 13.5 weight percent, or 14 weight percent, or 14.5 weight percent, or 15 weight percent; or comprising a lower limit of magnesia of 10.3 and an upper limit of magnesia of 11 weight percent, or 11.1 weight percent, or 11.2 weight percent, or 11.3 weight percent, or 11.4 weight percent, or 11.7 weight percent, or 12 weight percent, or 12.3 weight percent, or 12.7 weight percent, or 13 weight percent, or 13.5 weight percent, or 14 weight percent, or 14.5 weight percent, or 15 weight percent; or comprising a lower limit of magnesia of 10.5 and an upper limit of magnesia of 11 weight percent, or 11.1 weight percent, or 11.2 weight percent, or 11.3 weight percent, or 11.4 weight percent, or 11.7 weight percent, or 12 weight percent, or 12.3 weight percent, or 12.7 weight percent, or 13 weight percent, or 13.5 weight percent, or 14 weight percent, or 14.5 weight percent, or 15 weight percent; or comprising a lower limit of magnesia of 10.6 and an upper limit of magnesia of 11 weight percent, or 11.1 weight percent, or 11.2 weight percent, or 11.3 weight percent, or 11.4 weight percent, or 11.7 weight percent, or 12 weight percent, or 12.3 weight percent, or 12.7 weight percent, or 13 weight percent, or 13.5 weight percent, or 14 weight percent, or 14.5 weight percent, or 15 weight percent; or comprising a lower limit of magnesia of 10.8 and an upper limit of magnesia of 11 weight percent, or 11.1 weight percent, or 11.2 weight percent, or 11.3 weight percent, or 11.4 weight percent, or 11.7 weight percent, or 12 weight percent, or 12.3 weight percent, or 12.7 weight percent, or 13 weight percent, or 13.5 weight percent, or 14 weight percent, or 14.5 weight percent, or 15 weight percent; or comprising a lower limit of magnesia of 10.9 and an upper limit of magnesia of 11 weight percent, or 11.1 weight percent, or 11.2 weight percent, or 11.3 weight percent, or 11.4 weight percent, or 11.7 weight percent, or 12 weight percent, or 12.3 weight percent, or 12.7 weight percent, or 13 weight percent, or 13.5 weight percent, or 14 weight percent, or 14.5 weight percent, or 15 weight percent; or comprising a lower limit of magnesia of 11 and an upper limit of magnesia of 11.1 weight percent, or 11.2 weight percent, or 11.3 weight percent, or 11.4 weight percent, or 11.7 weight percent, or 12 weight percent, or 12.3 weight percent, or 12.7 weight percent, or 13 weight percent, or 13.5 weight percent, or 14 weight percent, or 14.5 weight percent, or 15 weight percent; or comprising a lower limit of magnesia of 11.5 and an upper limit of magnesia 11.7 weight percent, or 12 weight percent, or 12.3 weight percent, or 12.7 weight percent, or 13 weight percent, or 13.5 weight percent, or 14 weight percent, or 14.5 weight percent, or 15 weight percent.

3. An inorganic fiber according to statement 1 or 2 comprising a lower limit of calcia of 12.4 weight percent and an upper limit of calcia of 12.5 weight percent, or 13.4 weight percent, or 13.5 weight percent, or 13.8 weight percent, or 14 weight percent, or 14.5 weight percent, or 15 weight percent, or 15.5 weight percent, or 16 weight percent, or 16.5 weight percent, or 17 weight percent; or comprising a lower limit of calcia of 12.5 weight percent and an upper limit of calcia of 13.4 weight percent, or 13.5 weight percent, or 13.8 weight percent, or 14 weight percent, or 14.5 weight percent, or 15 weight percent, or 15.5 weight percent, or 16 weight percent, or 16.5 weight percent, or 17 weight percent;

comprising a lower limit of calcia of 12.6 weight percent and an upper limit of calcia of 13.4 weight percent, or 13.5 weight percent, or 13.8 weight percent, or 14 weight percent, or 14.5 weight percent, or 15 weight percent, or 15.5 weight percent, or 16 weight percent, or 16.5 weight percent, or 17 weight percent; or comprising a lower limit of calcia of 12.7 weight percent and an upper limit of calcia of 13.4 weight percent, or 13.5 weight percent, or 13.8 weight percent, or 14 weight percent, or 14.5 weight percent, or 15 weight percent, or 15.5 weight percent, or 16 weight percent, or 16.5 weight percent, or 17 weight percent; or comprising a lower limit of calcia of 12.8 weight percent and an upper limit of calcia of 13.4 weight percent, or 13.5 weight percent, or 13.8 weight percent, or 14 weight percent, or 14.5 weight percent, or 15 weight percent, or 15.5 weight percent, or 16 weight percent, or 16.5 weight percent, or 17 weight percent; or comprising a lower limit of calcia of 13 weight percent and an upper limit of calcia of 13.4 weight percent, or 13.5 weight percent, or 13.8 weight percent, or 14 weight percent, or 14.5 weight percent, or 15 weight percent, or 15.5 weight percent, or 16 weight percent, or 16.5 weight percent, or 17 weight percent; or comprising a lower limit of calcia of 13.3 weight percent and an upper limit of calcia of 13.4 weight percent, or 13.5 weight percent, or 13.8 weight percent, or 14 weight percent, or 14.5 weight percent, or 15 weight percent, or 15.5 weight percent, or 16 weight percent, or 16.5 weight percent, or 17 weight percent;

comprising a lower limit of calcia of 13.4 weight percent and an upper limit of calcia of 13.5 weight percent, or 13.8 weight percent, or 14 weight percent, or 14.5 weight percent, or 15 weight percent, or 15.5 weight percent, or 16 weight percent, or 16.5 weight percent, or 17 weight percent; or comprising a lower limit of calcia of 13.5 weight percent and an upper limit of calcia of 13.8 weight percent, or 14 weight percent, or 14.5 weight percent, or 15 weight percent, or 15.5 weight percent, or 16 weight percent, or 16.5 weight percent, or 17 weight percent.

4. An inorganic fiber according to any preceding statement comprising a lower limit of alumina of 0 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.1 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.2 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.3 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.4 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.5 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.6 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.7 weight percent and an upper limit of 0.8 weight percent, or 0.9 weight percent, or 1 weight percent, or 1.1 weight percent, or 1.2 weight percent, or 1.3 weight percent, or 1.4 weight percent, or 1.5 weight percent; or comprising a lower limit of alumina of 0.8 weight percent and an upper limit of 0.9 weight percent, or 1 weight percent, or 1.1 weight percent, or 1.2 weight percent, or 1.3 weight percent, or 1.4 weight percent, or 1.5 weight percent.

5. An inorganic fiber according to any preceding statement comprising a lower limit of total alkali oxides of 0 weight percent and an upper limit of 0.4 weight percent, or 0.5 weight percent, or 0.6 weight percent; or comprising a lower limit of total alkali oxides of 0.1 weight percent and an upper limit of 0.4 weight percent, or 0.5 weight percent, or 0.6 weight percent; or comprising a lower limit of total alkali oxides of 0.2 weight percent and an upper limit of 0.4 weight percent, or 0.5 weight percent, or 0.6 weight percent; or comprising a lower limit of total alkali oxides of 0.3 weight percent and an upper limit of 0.4 weight percent, or 0.5 weight percent, or 0.6 weight percent.

6. An inorganic fiber according to any preceding statement comprising a lower limit of lithium oxide of 0 weight percent and an upper limit of 0.2 weight percent, or 0.3 weight percent, or 0.4 weight percent, or 0.5 weight percent, or 0.6 weight percent; or comprising a lower limit of lithium oxide of 0.1 weight percent and an upper limit of 0.2 weight percent, or 0.3 weight percent, or 0.4 weight percent, or 0.5 weight percent, or 0.6 weight percent; or comprising a lower limit of lithium oxide of 0.2 weight percent and an upper limit of 0.3 weight percent, or 0.4 weight percent, or 0.5 weight percent, or 0.6 weight percent.

7. An inorganic fiber according to any preceding statement comprising a lower limit of potassium oxide of 0 weight percent and an upper limit of 0.2 weight percent, or 0.3 weight percent, or 0.4 weight percent, or 0.5 weight percent, or 0.6 weight percent; or comprising a lower limit of potassium oxide of 0.1 weight percent and an upper limit of 0.2 weight percent, or 0.3 weight percent, or 0.4 weight percent, or 0.5 weight percent, or 0.6 weight percent; or comprising a lower limit of potassium oxide of 0.2 weight percent and an upper limit of 0.3 weight percent, or 0.4 weight percent, or 0.5 weight percent, or 0.6 weight percent; or comprising a lower limit of potassium oxide of 0.3 weight percent and an upper limit of 0.4 weight percent, or 0.5 weight percent, or 0.6 weight percent.

8. An inorganic fiber according to any preceding statement comprising a comprise potassium oxide in an amount of 70 mol % or less, based on a total content of alkali metal oxides in the inorganic fibers.

9. An inorganic fiber according to any preceding statement comprising zirconia, or boron trioxide, or phosphorus pentoxide, or ferric oxide, or strontia, or combinations thereof.

10. An inorganic fiber according to any preceding statement excluding zirconia, or boron trioxide, or phosphorus pentoxide, or ferric oxide, or strontia, or combinations thereof.

11. An inorganic fiber according to any preceding statement comprising an additive selected from zirconia, boron trioxide, phosphorus pentoxide, ferric oxide, strontia, and combinations thereof in an amount of less than 0.1 weight percent or less than 0.05 weight percent.

12. An inorganic fiber according to any preceding statement, wherein the inorganic fiber has a use temperature of at least 1260° C., or at least 1280° C., or at least 1300° C., at least 1320° C., at least 1340° C., at most 1380° C., or at most 1400° C.

13. An inorganic fiber according to any preceding statement, wherein the inorganic fiber has a melt temperature of less than 1400° C., or from 1260° C. to less than 1400° C., or from 1300° C. to less than 1400° C., or from 1260° C. to 1380° C., or from 1300° C. to 1380° C.

14. An inorganic fiber according to any preceding statement, wherein the inorganic fiber exhibits a linear shrinkage of greater than 5% after exposure to a temperature of 1400° C. for 24 hours, or a linear shrinkage of greater than 5.5% after exposure to a temperature of 1400° C. for 24 hours, or a linear shrinkage of greater than 6% after exposure to a temperature of 1400° C. for 24 hours, or a linear shrinkage of less than 4% after exposure to a temperature of 1260° C. for 24 hours, or a linear shrinkage of less than 3.5% after exposure to a temperature of 1260° C. for 24 hours, or a linear shrinkage of less than 3% after exposure to a temperature of 1260° C. for 24 hours, or a linear shrinkage of less than 10% after exposure to a temperature of 1300° C. or greater for 24 hours.

15. An inorganic fiber according to any preceding statement comprising a weight percent ratio of potassium oxide to lithium oxide of less than 7, or less than 6.5, or less than 6, or less than 5.5, or less than 5, or less than 4.5, or less than 4, or less than 3.5, or less than 3, or less than 2.5, or less than 2.

16. An inorganic fiber according to any preceding statement comprising a sum of lithium oxide and potassium oxide of greater than 0.2 and less than 0.25, or less than 0.3, or less than 0.35, or less than 0.4, or less than 0.45, or less than 0.5; or comprising a sum of lithium oxide and potassium oxide of greater than 0.25 and less than 0.3, or less than 0.35, or less than 0.4, or less than 0.45, or less than 0.5; or comprising a sum of lithium oxide and potassium oxide of greater than 0.3 and less than 0.35, or less than 0.4, or less than 0.45, or less than 0.5; or comprising a sum of lithium oxide and potassium oxide of greater than 0.35 and less than 0.4, or less than 0.45, or less than 0.5; or comprising a sum of lithium oxide and potassium oxide of greater than 0.4 and less than 0.45, or less than 0.5.

Although the present disclosure has been described in reference to embodiments and optional features, modification and variation of the embodiments herein disclosed can be foreseen by those of ordinary skill in the art, and such modifications and variations are considered to be within the scope of the present disclosure. It is also to be understood that the above description is intended to be illustrative and not restrictive. Many alternative embodiments will be apparent to those of ordinary skill in the art upon reviewing the above description. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the disclosure.

What is claimed is:

1. A high temperature resistant inorganic fiber comprising:

72 to 77.3 weight percent silica;

10.5 to 15 weight percent magnesia;

12.5 to 17 weight percent calcia;

0 to 1.5 weight percent alumina; and 0.1 to 0.6 weight percent total alkali oxides;

wherein the fiber has a use temperature of at least 1260° C. and exhibits a shrinkage of less than 3% after exposure to a temperature of 1260° C. for 24 hours;

wherein the fiber exhibits a shrinkage of greater than 5% after exposure to a temperature of 1400° C. for 24 hours; and wherein the fiber does not comprise strontia.

2. The fiber of claim 1, wherein the fiber comprises 11 to 15 weight percent magnesia and 13 to 17 weight percent calcia.

3. The fiber of claim 1, wherein the fiber exhibits a dissolution rate of greater than 100 $ng/cm^2$-hr after 6 hours in simulated lung fluid.

4. The fiber of claim 1, wherein the fiber comprises greater than 0 to 0.5 weight percent lithium oxide.

5. The fiber of claim 1, wherein the fiber comprises greater than 0 to 0.5 weight percent potassium oxide.

6. The fiber of claim 1, wherein the fiber comprises 0.5 to 1.1 weight percent alumina.

7. The fiber of claim 1, wherein the fiber comprises:

73 to 75.8 weight percent silica;

11 to 15 weight percent magnesia;

13 to 17 weight percent calcia;

0.2 to 1.5 weight percent alumina; and 0.1 to 0.6 weight percent total alkali oxides.

8. The fiber of claim 1, wherein the fiber comprises potassium oxide and lithium oxide and wherein a weight ratio of potassium oxide to lithium oxide is less than 7.

9. The fiber of claim 1, wherein the fiber comprises potassium oxide and lithium oxide and wherein a sum of the potassium oxide and lithium oxide is from greater than 0.2 weight percent to less than 0.5 weight percent.

* * * * *